United States Patent
Nakajima (10) Patent No.: US 10,747,158 B2
(45) Date of Patent: Aug. 18, 2020

(54) DISTINCTION OF CAUSES OF ERRORS IN IMAGE FORMING APPARATUS

(71) Applicant: CANON KABUSHIKI KAISHA, Tokyo (JP)

(72) Inventor: Hirohisa Nakajima, Tsukubamirai (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/658,869

(22) Filed: Oct. 21, 2019

(65) Prior Publication Data
US 2020/0133181 A1    Apr. 30, 2020

(30) Foreign Application Priority Data

Oct. 30, 2018 (JP) ................. 2018-204339

(51) Int. Cl.
  *G03G 15/00*  (2006.01)
  *H02H 1/00*   (2006.01)
  *H02H 7/20*   (2006.01)

(52) U.S. Cl.
  CPC ......... *G03G 15/5004* (2013.01); *G03G 15/80* (2013.01); *H02H 1/0007* (2013.01); *H02H 7/20* (2013.01)

(58) Field of Classification Search
  CPC ...... G03G 15/55; G03G 15/80; G03G 15/553; G03G 15/1645; G03G 15/1675; G03G 15/5004
  See application file for complete search history.

(56) References Cited

U.S. PATENT DOCUMENTS

| | | | |
|---|---|---|---|
| 2013/0169990 A1* | 7/2013 | Yoshioka | H02J 9/061 358/1.14 |
| 2016/0202643 A1* | 7/2016 | Nakajima | G03G 15/1665 399/9 |
| 2018/0004141 A1* | 1/2018 | Yamaki | G03G 15/55 |
| 2020/0089141 A1* | 3/2020 | Shiraki | G06K 15/4055 |

FOREIGN PATENT DOCUMENTS

JP    2013-195475    9/2013

OTHER PUBLICATIONS

U.S. Appl. No. 16/559,760, filed Sep. 4, 2019 by Yohei Shiraki et al.

* cited by examiner

*Primary Examiner* — Thomas S Giampaolo, II
(74) *Attorney, Agent, or Firm* — Venable LLP (57) ABSTRACT

A control circuit determines that there is a failure in a power supply circuit in a case where a voltage detected by a voltage detection circuit when a constant-current control is performed is greater than a first predetermined value and a voltage detected by the voltage detection circuit when the first predetermined value is set as the target voltage in the constant-voltage control is greater than a second predetermined value greater than the first predetermined value and determine that there is an error in a load in a case where the voltage detected by the voltage detection circuit when the constant-current control is performed is greater than the first predetermined value and the voltage detected by the voltage detection circuit when the first predetermined value is set as the target voltage in the constant-voltage control is not greater than the second predetermined value.

13 Claims, 7 Drawing Sheets

FIG. 6

DISTINCTION OF CAUSES OF ERRORS IN IMAGE FORMING APPARATUS

BACKGROUND OF THE INVENTION

Field of the Invention

The present invention relates to a distinction of causes of errors in an image forming apparatus.

Description of the Related Art

An electrophotographic image forming apparatus transfers an image formed on a photosensitive drum onto an intermediate transfer belt by applying a primary transfer voltage to a primary transfer roller. Generally, the primary transfer voltage is a DC voltage and is controlled to be set within a proper range. In view of this, the image forming apparatus performs a constant-current control with a predetermined current value as a target value at the start of image formation. Next, during the image formation, the image forming apparatus performs a constant-voltage control with the voltage value generated by the preceding constant-current control as a target value. Here, when the voltage generated in the constant-current control falls outside a proper range, it is necessary to distinguish between an error in a rotary system such as a motor and an error in a power supply circuit. Japanese Patent Laid-Open No. 2013-195475 discloses that whether there is an error in the primary transfer voltage is determined after determining whether there is an error in the rotary system to distinguish between the error of the rotary system and the error of the primary transfer voltage.

In the Japanese Patent Laid-Open No. 2013-195475, it is determined that there is a voltage error when the primary transfer voltage exceeds a proper range in a state where there is no error in the rotary system. However, the primary transfer voltage may fall outside the proper range due to a failure in the power supply circuit and/or to a failure in the power supply circuit, and the image formation should be stopped when there is a failure in the power supply circuit. When there is an error in the load, the image formation can be continued. Therefore, a failure in the power supply circuitry and a failure in the load are required to be distinguished from each other.

SUMMARY OF THE INVENTION

The present invention provides an image forming apparatus comprising the following elements. A power supply circuit is configured to supply a voltage to a load used for image formation. A current detection circuit is configured to detect a current flowing in the load. A voltage detection circuit is configured to detect a voltage applied to the load. A control circuit is configured to perform a constant-current control and a constant-voltage control. The constant-current control is a control where a current that flows in the load and that is detected by the current detection circuit is controlled to a target current. The constant-voltage control is a control where a voltage that is applied to the load and that is detected by the voltage detection circuit is controlled to a target voltage. The control circuit is further configured to determine that there is a failure in the power supply circuit in a case where a voltage detected by the voltage detection circuit when the constant-current control is performed is greater than a first predetermined value and a voltage detected by the voltage detection circuit when the first predetermined value is set as the target voltage in the constant-voltage control is greater than a second predetermined value greater than the first predetermined value and determine that there is an error in the load in a case where the voltage detected by the voltage detection circuit when the constant-current control is performed is greater than the first predetermined value and the voltage detected by the voltage detection circuit when the first predetermined value is set as the target voltage in the constant-voltage control is not greater than the second predetermined value.

Further features of the present invention will become apparent from the following description of exemplary embodiments (with reference to the attached drawings).

DESCRIPTION OF THE EMBODIMENTS

Embodiments will be described in detail with reference to the accompanying drawings. Note that the following embodiments are not intended to limit the invention according to the claims, and the combinations of the features described in the embodiments are not restrictive. Two or more features of the plurality of features described in the embodiments may be optionally combined. In addition, the same or similar configurations are denoted with the same reference numerals, and redundant descriptions thereof will be omitted.

Image Forming Apparatus

Figure 1:
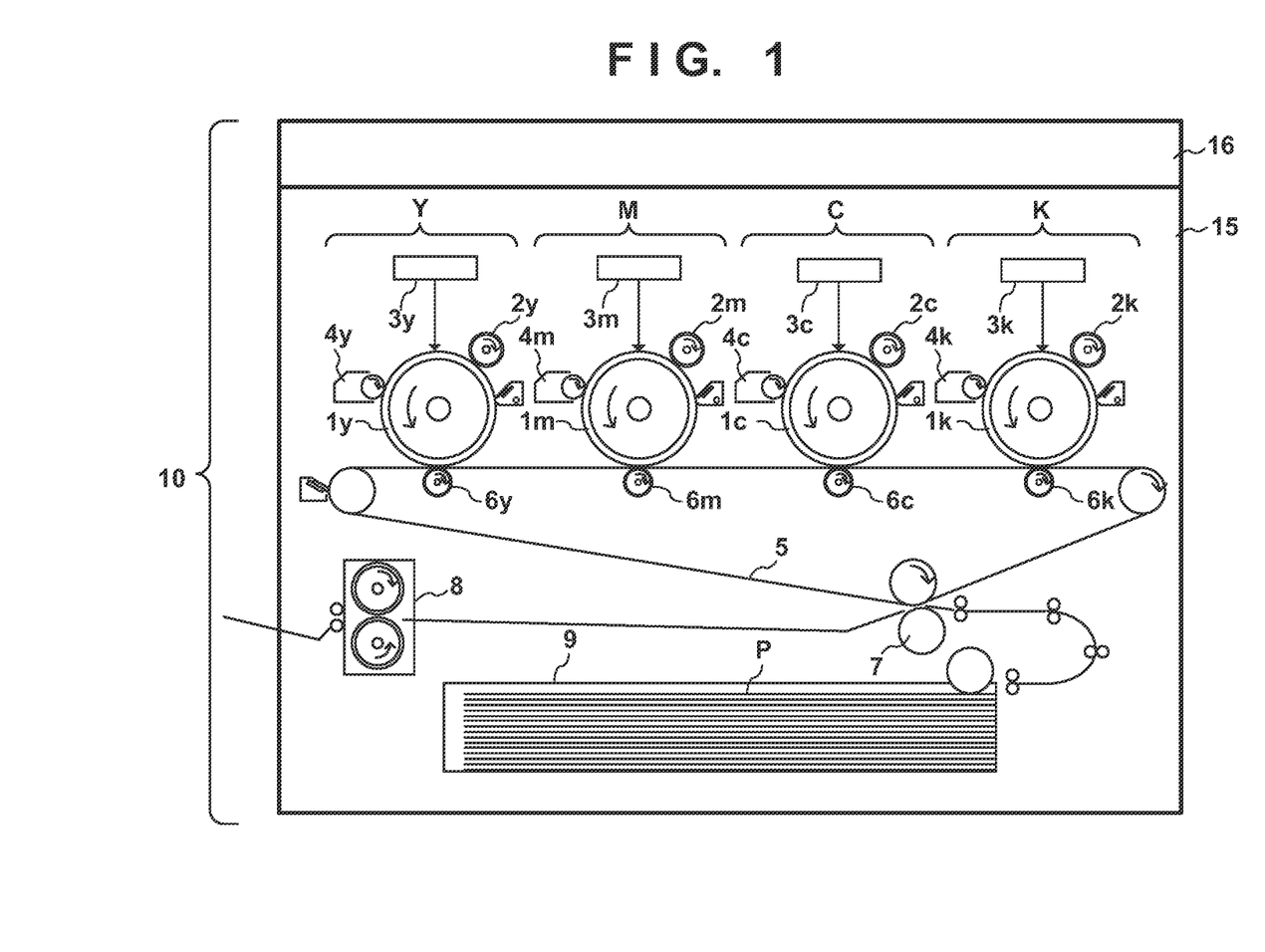
FIG. 1 is a schematic cross-sectional view illustrating an image forming apparatus.

FIG. 1 is a schematic cross-sectional view of an image forming apparatus 10 as viewed from the front side of the image forming apparatus 10. With reference to FIG. 1, the image forming apparatus 10 includes a reading unit 16 that reads an original document and an image forming engine 15. The image forming engine 15 includes four image forming stations (image forming units) that superimpose toners of four colors, such as yellow (Y), magenta (M), cyan (C), and black (K), to form a multi-color image. While a letter given at the end of a reference sign represents a color of a toner, the letters YMCK are omitted when describing matters common to the four colors. A photosensitive member 1 is an image bearing member having a drum-like shape that bears electrostatic latent images and toner images. A charging roller 2 of a charging apparatus applies a charging voltage to the photosensitive member 1 to uniformly charge the surface of the photosensitive member 1. The charging voltage is generated by superimposing an alternating current voltage on a direct current voltage. An optical scanning apparatus 3 is an optical scanning apparatus including a laser light source and a rotating polygonal mirror. The optical scanning apparatus 3 outputs laser light while modulating the laser light in accordance with image data, and deflects the laser light with the rotating polygonal mirror. In this manner, the laser light scans the surface of the photosensitive member 1, and an electrostatic latent image corresponding to the image data is formed. Thus, the optical scanning apparatus 3 functions as an exposing unit that exposes a uniformly charged surface of a photosensitive member to form an electrostatic latent image. A developer 4 houses a toner and forms a toner image by attaching the toner to the electrostatic latent image via a developing sleeve. The primary transfer roller 6 cooperates with the photosensitive member 1 to sandwich the intermediate transfer belt 5 therebetween, and transfers the toner image borne on the photosensitive member 1 to the intermediate transfer belt 5. The toner images of the four colors are sequentially transferred to the intermediate transfer belt 5 to form a multi-color image. The intermediate transfer belt 5 transports the toner image to a secondary transfer unit. In the secondary transfer unit, a secondary transfer roller 7 transports the intermediate transfer belt 5 and a sheet P fed from a cassette 9 in a sandwiching manner. In this manner, the multi-color toner image borne on the intermediate transfer belt 5 is transferred to the sheet P. A fixing apparatus 8 fixes the toner image to the sheet P by applying heat and pressure to the sheet P and the toner image.

Control Substrate and Power Supply Substrate

Figure 2:
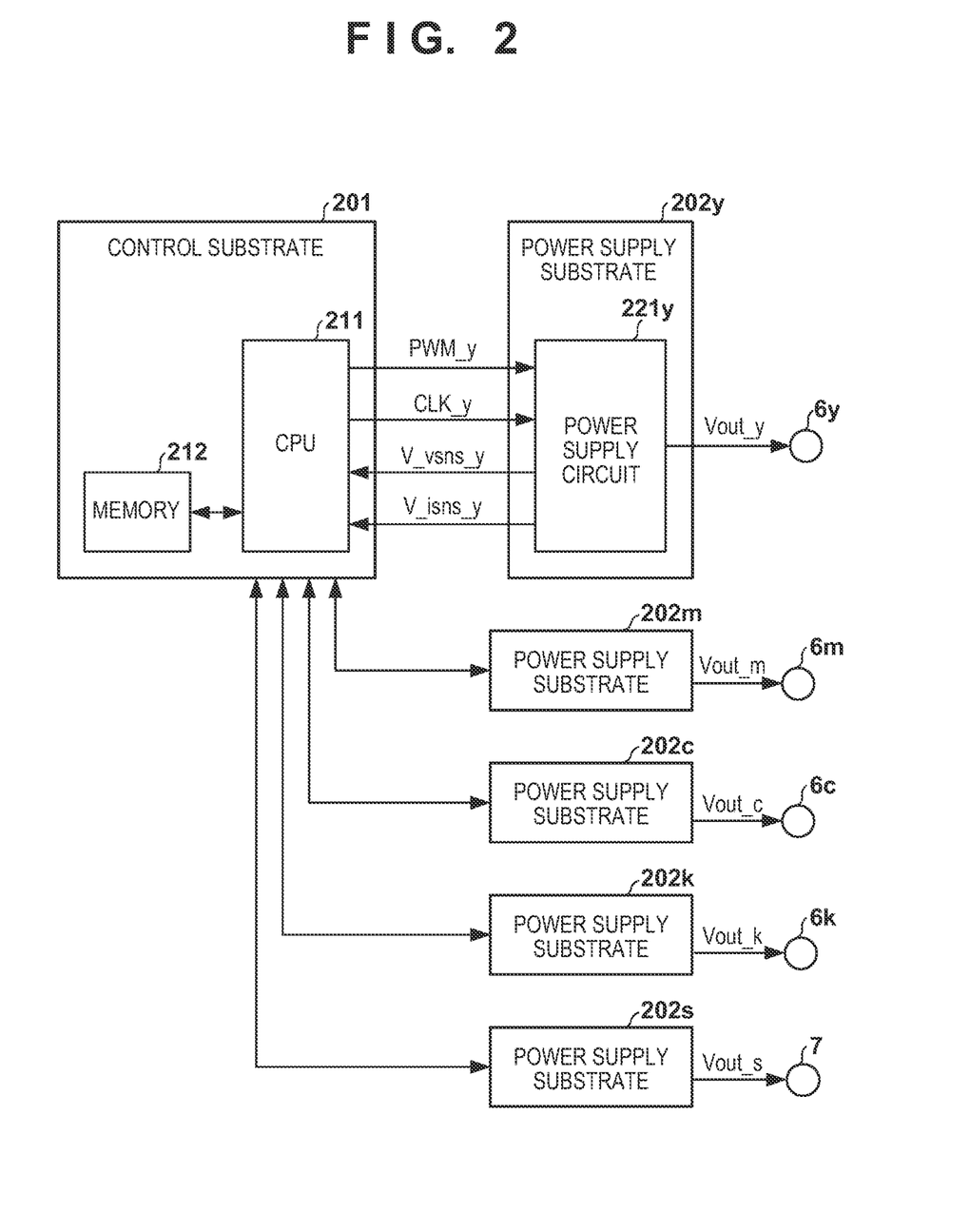
FIG. 2 is a diagram illustrating a control substrate and a power supply substrate.

FIG. 2 illustrates a control substrate 201 and power supply substrates 202y, 202m, 202c, 202k, and 202s. The power supply substrate 202y applies a voltage Vout_y to a primary transfer roller 6y. The power supply substrate 202m applies a voltage Vout_m to a primary transfer roller 6m. The power supply substrate 202c applies a voltage Vout_c to a primary transfer roller 6c. The power supply substrate 202k applies a voltage Vout_k to a primary transfer roller 6k. The power supply substrate 202s applies a voltage Vout_s to the secondary transfer roller 7. Since the power supply substrates 202y, 202m, 202c, 202k, and 202s have a common basic operation, the power supply substrate 202y is elaborated here as a representative. In the following description, the letters ymcks are omitted for simplicity and clarity of description.

The power supply substrate 202 includes a power supply circuit 221 that generates a voltage Vout. A CPU 211 mounted on the control substrate 201 generates a CLK signal (e.g., 3.4 V, 50 kHz, and 25% duty) and a PWM signal (e.g., 3.4 V, 50 kHz, and variable duty) and supplies the signals to the power supply circuit 221. CLK is an abbreviation for clock. PWM is an abbreviation for pulse width modulation. The power supply circuit 221 generates the voltage Vout on the basis of the CLK signal and the PWM signal and outputs it to the load. The load is the primary transfer roller 6 or the secondary transfer roller 7. The voltage Vout may be referred to as a primary transfer voltage or a secondary transfer voltage. The power supply circuit 221 feeds, back to the CPU 211, a current detection value V_isns proportional to a current Iout flowing in the load (the primary transfer roller 6 or the secondary transfer roller 7), and a voltage detection value V_vsns proportional to the voltage Vout. CPU is an abbreviation for central processing unit. CPU may be referred to as a processor, a microprocessor, or a processing circuit, for example. The CPU 211 may be realized as a logic circuit such as an ASIC and an FPGA. ASIC is an abbreviation for application-specific integrated circuit. FPGA is an abbreviation for field programmable gate array. The CPU 211 samples the voltage detection value V_vsns and the current detection value V_isns at a predetermined sampling rate (e.g., 10 kHz). A memory 212 includes a RAM region and a ROM region. RAM is an abbreviation for random access memory. ROM is an abbreviation for read only memory. The memory 212 stores a target value for the voltage detection value V_vsns and a target value for the current detection value V_isns. The target value for the voltage detection value V_vsns is used to control the voltage Vout to a target voltage Vtarget. The target value for the current detection value V_isns is used to control the current Iout to a target current Itarget. The CPU 211 performs a constant-current control and a constant-voltage control. In the constant-current control, the CPU 211 adjusts the duty ratio of the PWM signal such that the current detection value V_isns is set to a target value V_isns_target. In the constant-voltage control, the CPU 211 adjusts the duty ratio of the PWM signal such that the voltage detection value V_vsns is set to a target value V_vsns_target. The load may be a primary transfer member (e.g., the primary transfer roller 6) that transfers a toner image to an intermediate transfer body. The load may be a secondary transfer member (e.g., the secondary transfer roller 7) that transfers a toner image from the intermediate transfer body (e.g., the intermediate transfer belt 5) to the sheet P. Note that the primary transfer voltage and the secondary transfer voltage are voltages that facilitate transfer of a toner image.

The CPU 211 determines the target value V_isns_target on the basis of the environmental condition (e.g. temperature and humidity) and the durability condition (e.g., the total number of sheets for image formation), and performs a constant-current control on the power supply substrate 202. The voltage Vout at the time when the target value V_isns_target is attained is determined to be the target voltage. Further, the CPU 211 performs a constant-voltage control on the power supply substrate 202 such that the voltage Vout is set to the target voltage Vtarget during the image formation.

Power Supply Circuit

Figure 3:
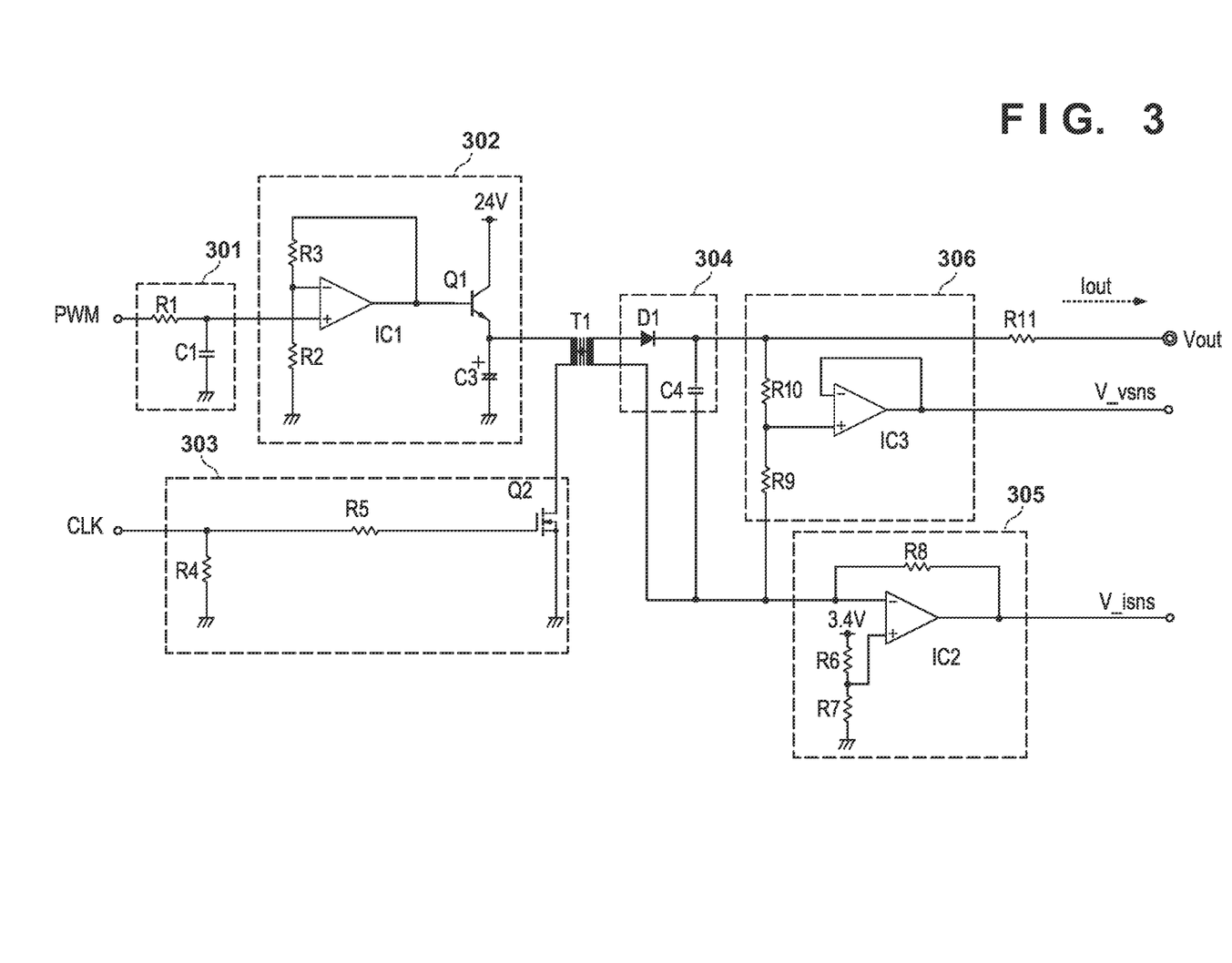
FIG. 3 is a circuit diagram of a power supply circuit.

As illustrated in FIG. 3, the power supply circuit 221 includes a PWM smoothing unit 301, an amplification unit 302, a transformer drive unit 303, a transformer T1, a high-voltage rectifying unit 304, a current detection unit 305, and a voltage detection unit 306.

PWM Smoothing Unit 301

The PWM smoothing unit 301 includes a low-pass filter composed of a resistor R1 and a capacitor C1. The PWM smoothing unit 301 converts an input PWM signal into a DC voltage at a predetermined cutoff frequency. The voltage level output from the PWM smoothing unit 301 changes within a predetermined range (e.g., from 0 V to 3.4 V) in accordance with the duty ratio of the input PWM signal.

Amplification Unit 302

The amplification unit 302 includes an amplifier circuit composed of an operational amplifier IC1, resistors R2 and R3, a transistor Q1, and an electrolytic capacitor C3. The amplification unit 302 amplifies the voltage output from the PWM smoothing unit 301 by the operational amplifier IC1, and the resistors R2, R3 at a predetermined magnification. The transistor Q1 amplifies the current. Thus, the voltage on the primary side of the transformer T1, which is the voltage of the electrolytic capacitor C3, is variable within a predetermined range (e.g., from 0 V to 20 V). For example, the input voltage from 0 V to 3.4 V is amplified to an output voltage from 0 V to 20 V.

Transformer Drive Unit 303

The transformer drive unit 303 is composed of a pull-down resistor R4, a damping resistor R5, and an FETQ2, and is a circuit that drives the transformer T1. The transformer T1 boosts the voltage of the electrolytic capacitor C3. The transformer drive unit 303 repeats on and off of the FETQ2 in accordance with the CLK signal. For example, the frequency of the CLK signal is 50 kHz and the duty ratio of the CLK signal is 25% duty. Thus, the start and stop of the operation of the transformer T1 are controlled.

High-Voltage Rectifying Unit 304

The high-voltage rectifying unit 304 is a rectifying and smoothing circuit composed of a high-voltage diode D1 and a high-voltage ceramic capacitor C4. The high-voltage rectifying unit 304 rectifies and smoothens the AC voltage output from the transformer T1 to generate a DC voltage Vout.

Current Detection Unit 305

The current detection unit 305 is composed of an operational amplifier IC2, a resistor R6, a resistor R7, and a resistor R8. A voltage (e.g., 1.0 V) obtained by dividing a reference voltage (e.g., 3.4 V) by the resistor R6 (e.g., 24 kΩ) and the resistor R7 (e.g. 10 kΩ) is input to the + terminal of the operational amplifier IC2. The output of the operational amplifier IC2 is fed back to the − terminal of the operational amplifier IC2 through the resistor R8 (e.g., 33 kΩ). Accordingly, the voltage at the − terminal of the operational amplifier IC2 is the same as the voltage at the + terminal, and each voltage is 1.0 V. Also, a current identical to the current Iout that flows through the primary transfer roller 6 flows through the resistor R8. The current detection value V_isns is proportional to the current Iout.

$$V\_isns\ [V] = 1.0\ [V] + Iout\ [uA] \times 33\ [k\Omega] \quad (1)$$

For example, when the current Iout is 0 uA, the current detection value V_isns is 1.0 V. When the current Iout is 30 uA, the current detection value V_isns is 1.99 V. When the current Iout is 60 uA, the current detection value V_isns is 2.98 V.

Voltage Detection Unit 306

The voltage detection unit 306 is composed of an operational amplifier IC3, a resistor R9 and a resistor R10. One end of the resistor R9 (e.g., 18 kΩ) is connected with the − terminal of the operational amplifier IC2. One end of the resistor R10 (e.g., 30 MΩ) is connected with the high-voltage rectifying unit 304. Through voltage-follower by the operational amplifier IC3, the voltage at the middle point between the resistor R9 and the resistor R10 becomes the voltage detection value V_vsns. The relationship between the voltage Vout and the voltage detection value V_vsns is determined by the following equation.

$$V\_vsns\ [V] = (Vout\ [V] - 1.0\ [V]) \times 18\ [k\Omega]/(30\ [M\Omega] + 18\ [k\Omega]) + 1.0\ [V] \quad (2)$$

For example, when the voltage Vout is 0 V, the voltage detection value V_vsns is 1.00 V. When the voltage Vout is 2000 V, the voltage detection value V_vsns is 2.20 V. When the voltage Vout is 3500 V, the voltage detection value V_vsns is 3.10 V.

The CPU 211 adjusts the PWM signal such that the voltage detection value V_vsns is set to the target value V_vsns_target, or the CPU 211 adjusts the PWM signal such that the current detection value V_isns is set to the target value V_isns_target. Thus, the constant-voltage control and the constant-current control are performed in the same control circuit.

Flowchart

Figure 4:
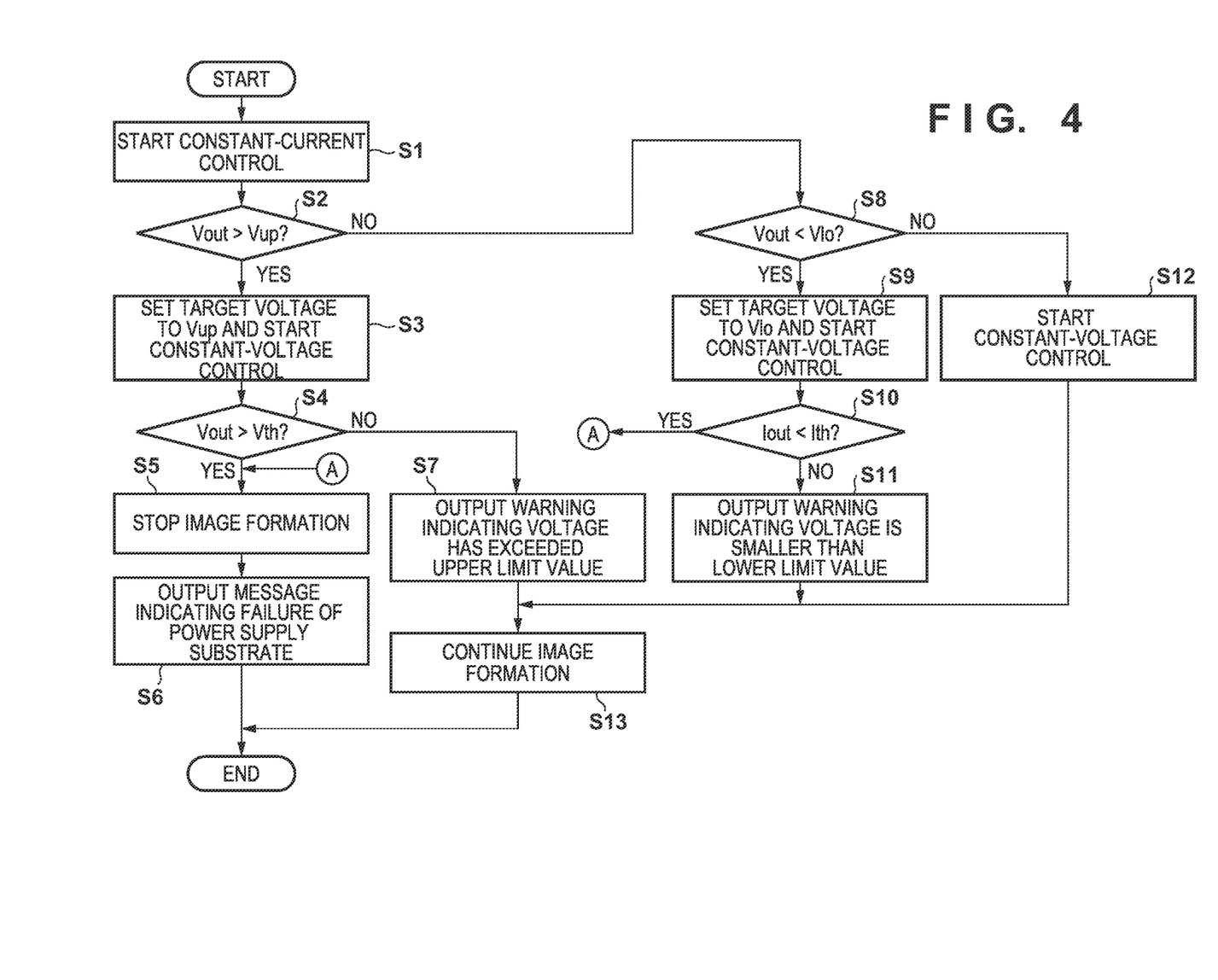
FIG. 4 is a flow chart illustrating a control method
Figure 5A:
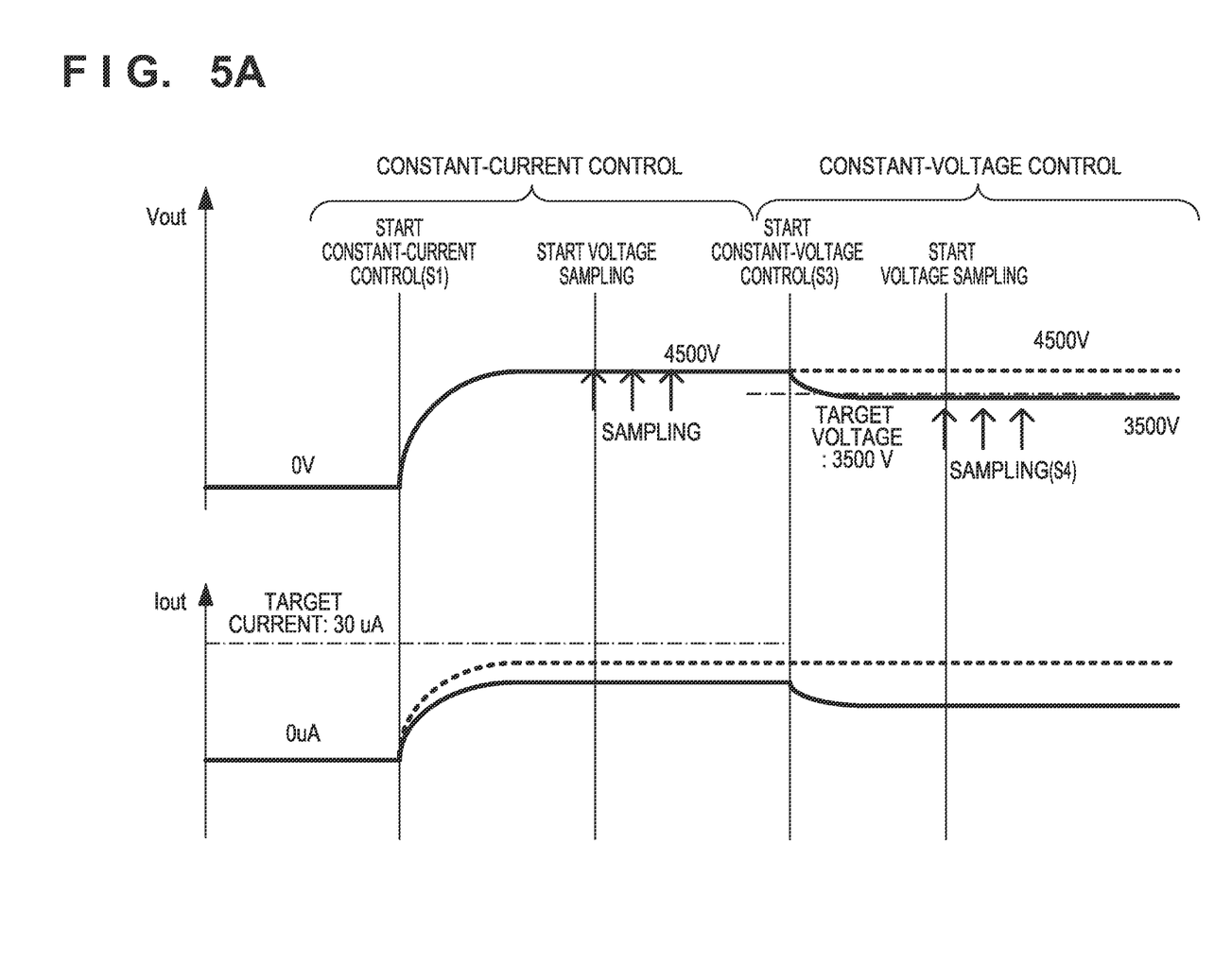
FIGS. 5A and 5B are diagrams illustrating changes in a voltage Vout and a current Iout during image formation.

FIG. 4 illustrates a control method that is performed by the CPU 211. FIG. 5A illustrates a change in a voltage Vout during image formation. When the user presses a copy button provided in an operation unit 610 (FIG. 6), the CPU 211 performs the following control method.

At S1, the CPU 211 starts a constant-current control. For example, the CPU 211 starts an output of the CLK signal and sets a target current of the current Iout to a predetermined address of the memory 212. The CPU 211 may set the target current in a range of 10 uA to 30 uA in accordance with the environmental condition and the durability condition. In FIG. 5A, the target current is set to 30 uA. Note that, specifically, the target value V_isns_target for comparison with the current detection value V_isns is set. The constant-current control includes a feedback control. In this manner, the voltage Vout increases until the current Iout matches the target current Itarget (until the current detection value V_isns matches the target value V_isns_target). The voltage Vout that is generated when the constant-current control is performed varies depending on the impedance of the load (the primary transfer roller 6 and/or the secondary transfer roller 7). When there is no error in the image forming apparatus 10, the proper range of the voltage Vout is 100 V to 3500 V. In this case, the lower limit value Vlo of the proper range is 100 V, and the upper limit value Vup of the proper range is 3500 V. Note that these values are merely examples of the numerical values adopted in the examples. Here, a certain amount of time is required for stabilization of the voltage Vout after the CPU 211 starts the constant-current control. When a wait time (e.g., 200 ms) longer than that time has elapsed, the CPU 211 advances the process to S2.

At S2, the CPU 211 determines whether the voltage Vout is greater than the upper limit Vup (e.g., 3500 V) of the proper range. More specifically, the voltage detection value V_vsns and a value V_vsns_up corresponding to the upper limit value Vup are compared with each other. When the voltage Vout is greater than the upper limit Vup, the CPU 211 determines that there is an error in the voltage Vout, and advances the process to S3. One cause of the error in the voltage Vout may be an abnormally high impedance of the load. The change of the voltage Vout in this case is indicated by the solid line in FIG. 5A. Another cause of the error in the voltage Vout may be a failure of the power supply circuit 221. In this case, the power supply circuit 221 outputs the maximum voltage that can be output. Such a state is illustrated by the dashed lines in FIG. 5A. As illustrated in FIG. 5A, the voltage Vout exceeds 3500 V due to any of the causes. At this time point, the CPU 211 cannot distinguish between the error of the power supply circuit 221 and the error of the load.

At S3, the CPU 211 sets the upper limit value Vup as the target voltage for the voltage Vout at a predetermined address of the memory 212, and starts the constant-voltage control. The upper limit value Vup is adopted as a control result of the constant-current control. Note that, specifically, the target value V_vsns_target for comparison with the voltage detection value V_vsns is set. When a predetermined wait time (e.g., 200 ms) has elapsed, the CPU 211 advances the process to S4.

At S4, the CPU 211 determines whether the voltage Vout is greater than a voltage threshold Vth. Specifically, the voltage detection value V_vsns and a value V_vsns_th corresponding to the voltage threshold Vth are compared with each other. The voltage threshold Vth is greater than the upper limit value Vup and is 3700 V, for example. The voltage threshold Vth is the upper limit voltage at which the image forming engine 15 can continue image formation. The voltage threshold Vth is determined in consideration of variations in the voltage Vout and variations in the voltage detection value V_vsns and is stored in the memory 212. For example, when the voltage Vout is 3500 V, the voltage threshold Vth is set to 3700 V. When the voltage Vout is greater than the voltage threshold Vth, the CPU 211 determines that there is a failure in the power supply circuit 221, and advances the process to S5.

At S5, the CPU 211 stops the image formation of the image forming engine 15. At S6, the CPU 211 outputs a message indicating a failure of the power supply substrate to the display device of the operation unit 610.

On the other hand, when the voltage Vout is greater than the upper limit value Vup at S2 and the voltage Vout is equal to or smaller than the voltage threshold Vth at S4, the CPU 211 determines that the impedance of the load is high, and advances the process to S7. At S7, the CPU 211 outputs a warning indicating that the voltage has exceeded the upper limit value to the display device of the operation unit 610. This is because the high impedance of the load is not a failure of the power supply circuit 221. At S13, the CPU 211 continues the image formation.

When the load resistance is large as described above, the voltage Vout during the constant-current control may exceed the proper range. However, as long as there is no failure in the power supply circuit 221, the constant-voltage control functions normally. Accordingly, when the voltage Vout is equal to or smaller than the voltage threshold Vth, the CPU 211 determines that the constant-voltage control can be performed normally and that there is no failure in the power supply circuit 221. In contrast, when the voltage Vout has exceeded the voltage threshold Vth, the CPU 211 determines that neither the constant-current control nor the constant-voltage control can be performed normally and that there is a failure in the power supply circuit 221. As illustrated in FIG. 3, the same drive circuit operates during both the constant-voltage control and the constant-current control. Consequently, when there is a failure in the power supply circuit 221, neither the constant-voltage control nor the constant-current control can be performed.

Figure 5B:
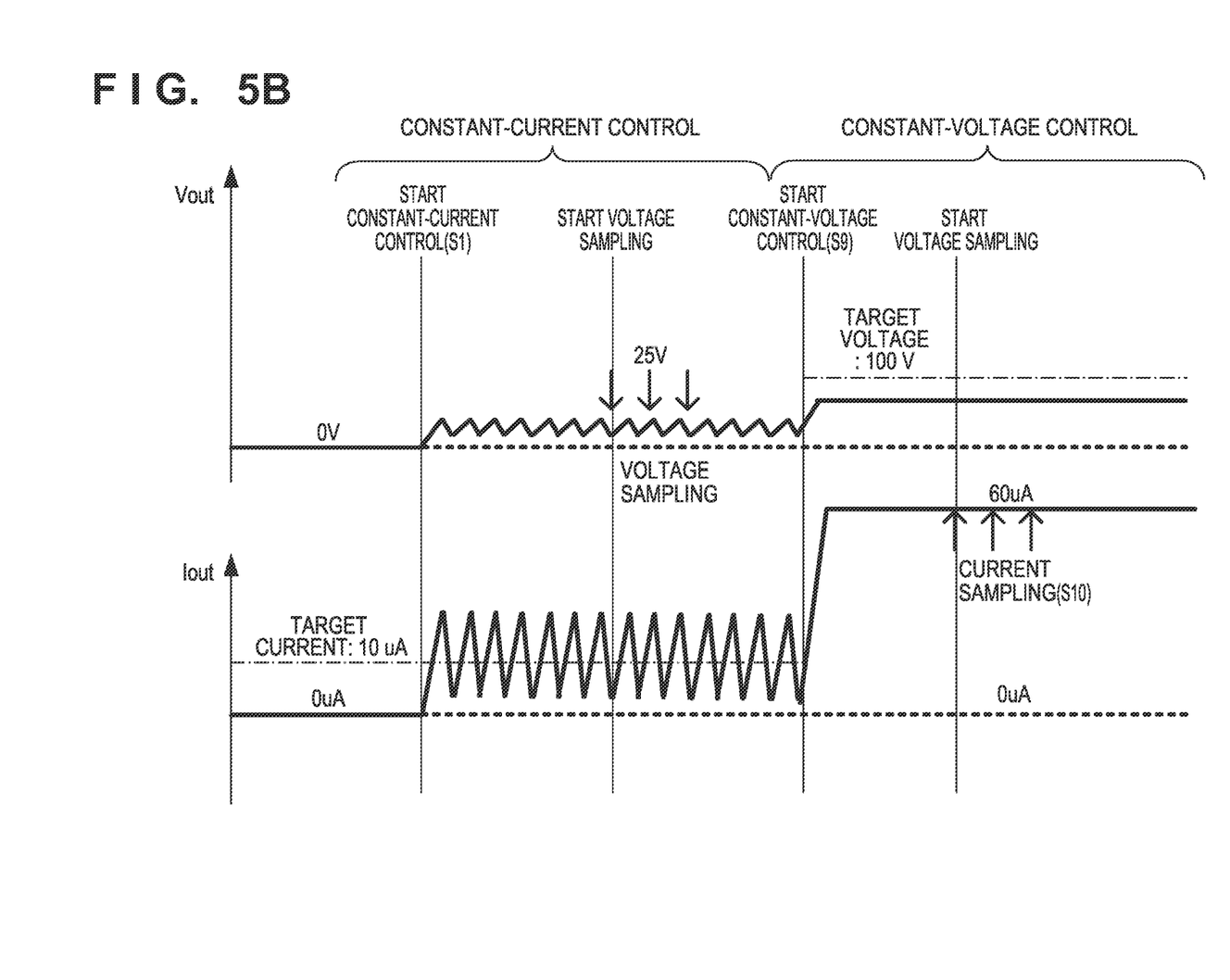

On the other hand, when the voltage Vout is equal to or smaller than the upper limit value Vup, the CPU 211 advances the process to S8. At S8, the CPU 211 determines whether the voltage Vout during the constant-current control is smaller than the lower limit value Vlo (e.g., 100 V) of the proper range. More specifically, the voltage detection value V_vsns and a value V_vsns_lo corresponding to the lower limit value Vlo are compared with each other. When the voltage Vout is smaller than the lower limit value Vlo of the proper range, the CPU 211 determines that there is an error in the voltage Vout, and advances the process to S9. One cause of such an error in the voltage Vout may be the impedance of the load (the primary transfer roller 6 and/or the secondary transfer roller 7) abnormally reduced due to condensation or the like. Such a state is illustrated by the solid lines in FIG. 5B. Another cause may be that the voltage Vout is not output (failure of the power supply circuit 221) due to breakage of the transformer T1 of the power supply circuit 221. Such a state is illustrated by the dashed lines in FIG. 5B. When the load resistance is small, a large current flows even with a slight change in the duty of the PWM signal. Accordingly, the current Iout in the constant-current control largely changes, and consequently correct values of the current Iout cannot be obtained. In particular, the current Iout may be detected as a value smaller than the actual value. In such a case, a detection result similar to that of the case where there is a failure in the power supply circuit 221 is obtained. Consequently, while the CPU 211 can recognize an error of the voltage Vout, the CPU 211 cannot distinguish between whether the cause of the error is a failure of the power supply circuit 221 or an error of the load. When the voltage Vout is smaller than the lower limit value Vlo, the CPU 211 advances the process to S9.

At S9, the CPU 211 sets the target voltage of the voltage Vout to the lower limit value Vlo and starts the constant-voltage control. The lower limit value Vlo is adopted as a control result of the constant-current control. When the predetermined wait time has elapsed, the CPU 211 advances the process to S10.

At S10, the CPU 211 determines whether or not the current Iout is smaller than the current threshold value Ith (e.g., 5 uA). Specifically, the current detection value V_isns and a value V_isns_th corresponding to the current threshold value Ith are compared with each other. The current threshold value Ith is a minimum target current that can be set for the current Tout. When the current Iout is smaller than the current threshold value Ith, the CPU 211 determines that the current Iout is small due to a failure of the power supply circuit 221, and the CPU 211 advances the process to S5. The CPU 211 performs the above-described S5 and S6. On the other hand, the current Iout that is obtained when the voltage Vout during the constant-current control is smaller than the lower limit value Vlo and the constant-voltage control is performed with the lower limit value Vlo as the target voltage can be equal to or greater than the current threshold value Ith in some situation (YES at S10). In this case, the CPU 211 determines that the load resistance is small and that there is no failure in the power supply circuit 221, and the CPU 211 advances the process to S11.

At S11, the CPU 211 outputs a message indicating that the voltage is smaller than the lower limit value to the display device of the operation unit 610. At S13, the CPU 211 continues the image formation. When the load resistance is small, the voltage Vout during the constant-current control can be smaller than the lower limit value Vlo of the proper range in some situation. Even in such a case, as long as there is no failure in the power supply circuit 221, the constant-voltage control operates normally. Note that the current Iout may flow due to the small load resistance, and consequently the voltage Vout may not reach the target voltage. Accordingly, whether there is a failure in the power supply circuit 221 is determined on the basis of the current Iout instead of the voltage Vout. When the voltage Vout becomes smaller than the lower limit value Vlo in the constant-current control with the current threshold value Ith set as the target current, the CPU 211 switches the control to a constant-voltage control with the lower limit value Vlo set as the target voltage. When the power supply circuit 221 is in a normal state, the current Iout during the constant-voltage control is equal to or greater than the current threshold value Ith. In contrast, when there is a failure in the power supply circuit 221, the current Iout during the constant-voltage control is 0 uA (the dashed lines in FIG. 5B), and the current Iout is smaller than the current threshold value Ith. Accordingly, the CPU 211 can distinguish between a failure of the power supply circuit 221 and an error of the load on the basis of the current Iout during the constant-voltage control.

When the voltage Vout during the constant-current control falls within the proper range (No at S2 and No at S8), the CPU 211 determines that both the power supply circuit 221 and the load are in a normal state, and advances the process to S12. At S12, the CPU 211 sets the voltage Vout detected during the constant-current control to the target voltage Vtarget and switches the control from the constant-current control to the constant-voltage control, and, starts the constant-voltage control. At S13, the CPU 211 continues the image formation.

In this manner, the CPU 211 determines an error of the voltage Vout on the basis of the voltage Vout during the constant-current control. When the voltage Vout is greater than the upper limit value Vup, the constant-voltage control with the upper limit value Vup set as the target voltage is performed. On the basis of whether the voltage Vout thus obtained is greater than the voltage threshold Vth, a failure of the power supply substrate 202 and an error of the load are distinguished from each other. When the voltage Vout during the constant-current control is smaller than the lower limit value Vlo, the constant-voltage control with the lower limit value Vlo set as the target voltage is performed. On the basis of whether the current Iout thus obtained is greater than the current threshold value Ith, a failure of the power supply substrate 202 and an error of the load are distinguished from each other.

In the present embodiment, the constant-voltage control at the upper limit value of the proper range is performed when the voltage during the constant-current control exceeds the proper range. However, it suffices to adopt a value close to the upper limit as the target voltage. Likewise, in the present embodiment, the constant-voltage control at the lower limit value of the proper range is performed when the voltage during the constant-current control is smaller than the proper range. However, it suffices to set a value close to the lower limit value as the target voltage.

While the process of FIG. 4 is performed when the copy button is pressed in the above-mentioned description, the process may be performed in an initialization operation after power-on of the image forming apparatus to determine whether there is a failure. In this case, however, the image formation is not performed, and therefore the processes of S5 and S13 are unnecessary.

Overview

The technical ideas derived from the examples will be described below. The CPU 211 obtains a first control result by performing a constant-current control. The CPU 211 obtains a second control result by performing a constant-voltage control set in accordance with the first control result. Further, on the basis of the first control result and the second control result, the CPU 211 distinguishes between a failure in the power supply circuit 221 and an error in the load.

As illustrated in FIG. 2, the primary transfer roller 6 and/or the secondary transfer roller 7 is an example of the load used for image formation. The power supply substrate 202 and the power supply circuit 221 are examples of a power supply circuit that supplies a voltage to the load. As illustrated in FIG. 3, the current detection unit 305 is an example of a current detection circuit that detects a current flowing in the load. The voltage detection unit 306 is an example of a voltage detection circuit that detects a voltage applied to the load. The control substrates 201 and the CPU 211 are examples of a control circuit that performs a constant-current control and a constant-voltage control. The constant-current control is a control where a current that flows in the load and is detected by the current detection circuit is controlled to and maintains a target current. The constant-voltage control is a control where a voltage that is applied to the load and is detected by the voltage detection circuit is controlled to and maintains a target voltage. The control circuit determines that there is a failure in the power supply circuit when a first failure condition is met. The first failure condition includes two sub-conditions. The first sub-condition is that the voltage detected by the voltage detection circuit when the constant-current control is performed is greater than a first predetermined value (e.g., an upper limit value of a proper range). The second sub-condition is that, when the first predetermined value is set as the target voltage in the constant-voltage control, the voltage detected by the voltage detection circuit is greater than a second predetermined value (e.g., a threshold voltage greater than the upper limit value). The control circuit determines that there is an error in the load when a first error condition is met. The first error condition includes two sub-conditions. The first sub-condition is that the voltage detected by the voltage detection circuit when the constant-current control is performed is greater than the first predetermined value. The second sub-condition is that, when the first predetermined value is set as the target voltage in the constant-voltage control, the voltage detected by the voltage detection circuit is not greater than the second predetermined value. When both sub-conditions are met, the control circuit determines that there is an error in the load. Thus, a failure of the power supply circuit and an error in the load can be distinguished from each other.

The control circuit may make the determination based on a second failure condition. The second failure condition also includes two sub-conditions. The first sub-condition is that the voltage detected by the voltage detection circuit when the constant-current control is performed is smaller than a third predetermined value (e.g., a lower limit value of the proper range) smaller than the first predetermined value. The second sub-condition is that, when the third predetermined value is set as the target voltage in the constant-voltage control, the current detected by the current detection circuit is smaller than a fourth predetermined value (e.g., a current threshold value). When both sub-conditions are met, the control circuit determines that there is a failure in the power supply circuit.

The control circuit may make the determination on the basis of a second error condition. The second error condition also includes two sub conditions. The first sub-condition is that the voltage detected by the voltage detection circuit when the constant-current control is performed is smaller than the third predetermined value. The second sub-condition is that, when the third predetermined value is set as the target voltage in the constant-voltage control, the current detected by the current detection circuit is not smaller than the fourth predetermined value. When both sub-conditions are met, the control circuit determines that there is an error in the load.

Figure 6:
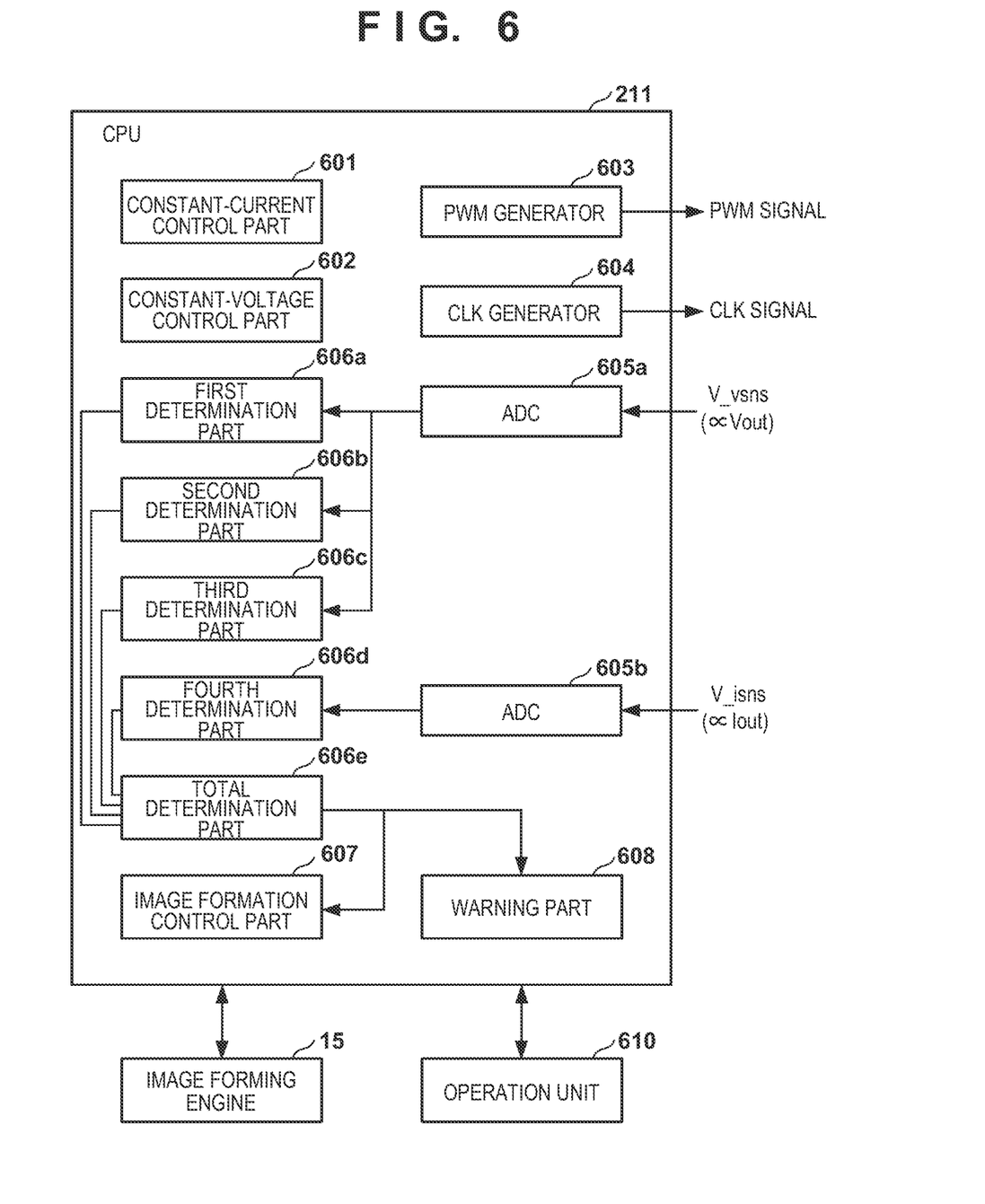
FIG. 6 is a diagram illustrating functions of a CPU.

FIG. 6 illustrates functions that are realized when the CPU 211 performs a control program stored in the memory 212. A constant-current control part 601 performs the above-described constant-current control. A constant-voltage control part 602 performs the above-described constant-voltage control. A PWM generator 603 generates and outputs a PWM signal with a duty ratio set by the constant-current control part 601 or the constant-voltage control part 602. A CLK generator 604 generates and outputs a CLK signal. An ADC 605a is a converter that performs analog-to-digital conversion on the voltage detection value V_vsns by sampling the voltage detection value V_vsns. An ADC 605b is a converter that performs analog-to-digital conversion on the current detection value V_isns by sampling the current detection value V_isns.

A first determination part 606a determines whether the voltage detected by the voltage detection circuit when the constant-current control is performed is greater than the first predetermined value. A second determination part 606b determines whether, when the first predetermined value is set as the target voltage in the constant-voltage control, the voltage detected by the voltage detection circuit is greater than a threshold voltage. A total determination part 606e determines whether there is a failure in the power supply circuit and whether there is an error in a load on the basis of the determination result of the first determination part 606a and the determination result of the second determination part 606*b*. The total determination part 606*e* may be referred to as a failure determination unit.

A third determination part 606*c* determines whether the voltage detected by the voltage detection circuit when the constant-current control is performed is smaller than the third predetermined value. When a fourth determination part 606*d* determines whether, when the third predetermined value is set as the target voltage in the constant-voltage control, the current detected by the current detection circuit is smaller than the fourth predetermined value. The total determination part 606*e* determines whether there is a failure in the power supply circuit and whether there is an error in the load on the basis of the determination result of the third determination part 606*c* and the determination result of the fourth determination part 606*d*.

An image formation control part 607 controls the image forming engine 15 on the basis of the determination result of the total determination part 606*e*. When there is a failure in the power supply circuit, the image formation control part 607 stops the image formation of the image forming engine 15 of the image forming apparatus 10. When there is no failure in the power supply circuit, the image formation control part 607 continues the image formation of the image forming engine 15. For example, when a load error is temporarily caused due to a foreign matter adhering to the primary transfer roller 6 and/or the secondary transfer roller 7 or the like, the image formation can be continued. Thus, unexpected interruption of the image formation can be prevented for the user.

As indicated by S7, a warning part 608 and a display device of the operation unit 610 function as an output unit that outputs a warning indicating that the voltage applied to the load is greater than an upper limit value when the first error condition is met. Thus, the user can recognize the type of the error that has been occurring.

When the first failure condition is not met but the first error condition is met, the image formation control part 607 may continue the image formation of the image forming apparatus 10. This is because the image formation can be continued even when the load resistance is large. Thus, unexpected interruption of the image formation can be prevented for the user.

Even when the load resistance of the transfer roller increases due to adhesion of a foreign matter, the foreign matter may be removed by continuously rotating the transfer roller. Accordingly, the CPU 211 may perform a control of interrupting the image forming operation for a certain time period so as rotate the transfer roller, or may perform a control of rebooting the image forming apparatus.

As indicated by S11, the warning part 608 and the display device of the operation unit 610 function as an output unit that outputs a warning indicating that the voltage applied to the load is smaller than the lower limit when the second error condition is met. Thus, the user can recognize the type of the error that has been occurring.

When the second error condition is met, the image formation control part 607 may continue the image formation of the image forming apparatus 10. Typically, the second error condition is met when condensation occurs. Slight condensation does not affect the image formation, and therefore the image formation may be continued. Thus, unexpected interruption of the image formation can be prevented for the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-204339, filed Oct. 30, 2018, which is hereby incorporated by reference herein in its entirety.

What is claimed is:

1. An image forming apparatus comprising:
a power supply circuit configured to supply a voltage to a load used for image formation;
a current detection circuit configured to detect a current flowing in the load;
a voltage detection circuit configured to detect a voltage applied to the load; and
a control circuit configured to perform a constant-current control and a constant-voltage control, the constant-current control being a control where a current that flows in the load and that is detected by the current detection circuit is controlled to a target current, the constant-voltage control being a control where a voltage that is applied to the load and that is detected by the voltage detection circuit is controlled to a target voltage,
wherein the control circuit is further configured to
determine that there is a failure in the power supply circuit in a case where a voltage detected by the voltage detection circuit when the constant-current control is performed is greater than a first predetermined value and a voltage detected by the voltage detection circuit when the first predetermined value is set as the target voltage in the constant-voltage control is greater than a second predetermined value greater than the first predetermined value and
determine that there is an error in the load in a case where the voltage detected by the voltage detection circuit when the constant-current control is performed is greater than the first predetermined value and the voltage detected by the voltage detection circuit when the first predetermined value is set as the target voltage in the constant-voltage control is not greater than the second predetermined value.

2. The image forming apparatus according to claim 1, wherein the control circuit is further configured to determine that there is a failure in the power supply circuit in a case where the voltage detected by the voltage detection circuit when the constant-current control is performed is smaller than a third predetermined value smaller than the first predetermined value and a current detected by the current detection circuit when the third predetermined value is set as the target voltage in the constant-voltage control is smaller than a fourth predetermined value and determine that there is an error in the load in a case where the voltage detected by the voltage detection circuit when the constant-current control is performed is smaller than the third predetermined value and the current detected by the current detection circuit when the third predetermined value is set as the target voltage in the constant-voltage control is not smaller than the fourth predetermined value.

3. The image forming apparatus according to claim 2, wherein the control circuit includes:
a third determination part configured to determine whether the voltage detected by the voltage detection circuit when the constant-current control is performed is smaller than the third predetermined value;
a fourth determination part configured to determine whether the current detected by the current detection circuit when the third predetermined value is set as the target voltage in the constant-voltage control is smaller than the fourth predetermined value; and
a failure determination part configured to determine whether there is a failure in the power supply circuit and whether there is an error in the load on a basis of a determination result of the third determination part and a determination result of the fourth determination part.

4. The image forming apparatus according to claim 2, further comprising an output unit configured to output a warning indicating that the voltage applied to the load is smaller than the fourth predetermined value in the case where the voltage detected by the voltage detection circuit when the constant-current control is performed is smaller than the third predetermined value and the current detected by the current detection circuit when the third predetermined value is set as the target voltage in the constant-voltage control is not smaller than the fourth predetermined value.

5. The image forming apparatus according to claim 2, wherein the image forming operation of the image forming apparatus is continued in the case where the voltage detected by the voltage detection circuit when the constant-current control is performed is smaller than the third predetermined value and the current detected by the current detection circuit when the third predetermined value is set as the target voltage in the constant-voltage control is not smaller than the fourth predetermined value.

6. The image forming apparatus according to claim 1, wherein the control circuit includes:
a first determination part configured to determine whether the voltage detected by the voltage detection circuit when the constant-current control is performed is greater than the first predetermined value;
a second determination part configured to determine whether the voltage detected by the voltage detection circuit when the first predetermined value is set as the target voltage in the constant-voltage control is greater than the second predetermined value; and
a failure determination part configured to determine whether there is a failure in the power supply circuit and whether there is an error in the load on a basis of a determination result of the first determination part and a determination result of the second determination part.

7. The image forming apparatus according to claim 1, wherein when a failure occurs in the power supply circuit, the control circuit stops the image forming operation of the image forming apparatus.

8. The image forming apparatus according to claim 1, further comprising an output unit configured to output a warning indicating that the voltage applied to the load is greater than the first predetermined value in the case where the voltage detected by the voltage detection circuit when the constant-current control is performed is greater than the first predetermined value and the voltage detected by the voltage detection circuit when the first predetermined value is set as the target voltage in the constant-voltage control is not greater than the second predetermined value.

9. The image forming apparatus according to claim 1, wherein the control circuit continues the image forming operation of the image forming apparatus in the case where the voltage detected by the voltage detection circuit when the constant-current control is performed is greater than the first predetermined value and the voltage detected by the voltage detection circuit when the first predetermined value is set as the target voltage in the constant-voltage control is not greater than the second predetermined value.

10. The image forming apparatus according to claim 1, wherein the load is a primary transfer member configured to transfer a toner image to an intermediate transfer body.

11. The image forming apparatus according to claim 1, wherein the load is a secondary transfer member configured to transfer a toner image from an intermediate transfer body to a sheet.

12. An image forming apparatus comprising:
a photosensitive member;
an image forming unit configured to form a toner image on the photosensitive member;
a primary transfer member configured to transfer the toner image to an intermediate transfer body;
a secondary transfer member configured to transfer the toner image borne on the intermediate transfer body to a sheet;
a power supply substrate configured to supply a transfer voltage to a load that is the primary transfer member or the secondary transfer member, the transfer voltage facilitating transfer of the toner image; and
a control substrate configured to control the power supply substrate, wherein
the power supply substrate includes
a power supply circuit configured to supply the transfer voltage to the load;
a current detection circuit configured to detect a current flowing in the load; and
a voltage detection circuit configured to detect a voltage applied to the load,
the control substrate includes
a control circuit configured to perform a constant-current control and a constant-voltage control, the constant-current control being a control where a current that flows in the load and that is detected by the current detection circuit is controlled to a target current, the constant-voltage control being a control where a voltage that is applied to the load and that is detected by the voltage detection circuit is controlled to a target voltage, and the control circuit is further configured to determine that there is a failure in the power supply circuit in a case where a voltage detected by the voltage detection circuit when the constant-current control is performed is greater than a first predetermined value and a voltage detected by the voltage detection circuit when the first predetermined value is set as the target voltage in the constant-voltage control is greater than a second predetermined value greater than the first predetermined value and determine that there is an error in the load in a case where the voltage detected by the voltage detection circuit when the constant-current control is performed is greater than the first predetermined value and the voltage detected by the voltage detection circuit when the first predetermined value is set as the target voltage in the constant-voltage control is not greater than the second predetermined value.

13. An image forming apparatus comprising:

a power supply circuit configured to supply a voltage to a load used for image formation;

a current detection circuit configured to detect a current flowing in the load;

a voltage detection circuit configured to detect a voltage applied to the load; and a control circuit configured to perform a constant-current control and a constant-voltage control, the constant-current control being a control where a current that flows in the load and that is detected by the current detection circuit is controlled to a target current, the constant-voltage control being a control where a voltage that is applied to the load and that is detected by the voltage detection circuit is controlled to a target voltage, wherein the control circuit distinguishes between a failure caused in the power supply circuit and an error caused in the load on a basis of a control result obtained by performing the constant-current control and a control result obtained by performing the constant-voltage control set in accordance with the control result obtained by performing the constant-current control.

* * * * *